United States Patent
McDonald (10) Patent No.: US 7,159,097 B2
(45) Date of Patent: Jan. 2, 2007

(54) APPARATUS AND METHOD FOR BUFFERING INSTRUCTIONS AND LATE-GENERATED RELATED INFORMATION USING HISTORY OF PREVIOUS LOAD/SHIFTS

(75) Inventor: Thomas McDonald, Austin, TX (US)

(73) Assignee: IP-First, LLC, Fremont, CA (US)

( * ) Notice: Subject to any disclaimer, the term of this patent is extended or adjusted under 35 U.S.C. 154(b) by 602 days.

(21) Appl. No.: 10/422,057

(22) Filed: Apr. 23, 2003

(65) Prior Publication Data

US 2004/0030866 A1 Feb. 12, 2004

Related U.S. Application Data

(60) Provisional application No. 60/380,739, filed on Apr. 26, 2002.

(51) Int. Cl.
*G06F 9/30* (2006.01)
*G06F 9/40* (2006.01)
*G06F 15/00* (2006.01)

(52) U.S. Cl. ...................... 712/205; 712/218
(58) Field of Classification Search ............... 712/205, 712/218, 219
See application file for complete search history.

(56) References Cited

U.S. PATENT DOCUMENTS

| | | | |
|---|---|---|---|
| 4,181,942 A | 1/1980 | Forster et al. |
| 4,200,927 A | 4/1980 | Hughes et al. |
| 4,860,197 A | 8/1989 | Langendorf et al. |
| 5,142,634 A | 8/1992 | Fite et al. |
| 5,163,140 A | 11/1992 | Stiles et al. |
| 5,313,634 A | 5/1994 | Eickemeyer |
| 5,353,421 A | 10/1994 | Emma et al. |
| 5,355,459 A | 10/1994 | Matsuo et al. |
| 5,394,530 A | 2/1995 | Kitta |
| 5,404,467 A | 4/1995 | Saba et al. |
| 5,434,985 A | 7/1995 | Emma et al. |
| 5,513,330 A | 4/1996 | Stiles |
| 5,530,825 A | 6/1996 | Black et al. |
| 5,553,246 A | 9/1996 | Suzuki |
| 5,604,877 A | 2/1997 | Hoyt et al. |
| 5,623,614 A | 4/1997 | Van Dyke et al. |
| 5,623,615 A | 4/1997 | Salem et al. |
| 5,634,103 A | 5/1997 | Dietz et al. |
| 5,687,349 A | 11/1997 | McGarity |
| 5,687,360 A | 11/1997 | Chang |
| 5,706,491 A | 1/1998 | McMahan |

(Continued)

OTHER PUBLICATIONS

*Microprocessor Report.* vol. 9. No. 2. Feb. 16, 1995. p. 5.

(Continued)

*Primary Examiner*—Fritz Fleming
*Assistant Examiner*—Jesse moll
(74) *Attorney, Agent, or Firm*—E. Alan Davis; James W. Huffman (57) ABSTRACT

An instruction buffering apparatus is disclosed. The apparatus includes an early queue and a late queue. The early queue receives an instruction generated during a first clock cycle. The late queue receives information related to the instruction during a second clock cycle subsequent to the first clock cycle. The early queue receives load/shift control signals for loading/shifting the early queue. Registers receive the early queue load/shift signals and provide delayed versions of the signals to the late queue for controlling loading/shifting the related information in the late queue. The late queue is configured such that when the apparatus is empty, the related information may be provided during the second clock cycle, i.e., in the same clock cycle that its related instruction is provided from the early queue.

41 Claims, 6 Drawing Sheets

U.S. PATENT DOCUMENTS

| | | | |
|---|---|---|---|
| 5,721,855 | A | 2/1998 | Hinton et al. |
| 5,734,881 | A | 3/1998 | White et al. |
| 5,752,069 | A | 5/1998 | Roberts et al. |
| 5,761,723 | A | 6/1998 | Black et al. |
| 5,768,576 | A | 6/1998 | Hoyt et al. |
| 5,805,877 | A | 9/1998 | Black et al. |
| 5,812,839 | A | 9/1998 | Hoyt et al. |
| 5,828,901 | A | 10/1998 | O'Toole et al. |
| 5,832,289 | A | 11/1998 | Shaw et al. |
| 5,850,532 | A | 12/1998 | Narayan et al. |
| 5,850,543 | A | 12/1998 | Shiell et al. |
| 5,864,707 | A | 1/1999 | Tran et al. |
| 5,867,701 | A | 2/1999 | Brown et al. |
| 5,881,260 | A | 3/1999 | Raje et al. |
| 5,881,265 | A | 3/1999 | McFarland et al. |
| 5,931,944 | A | 8/1999 | Ginosar et al. |
| 5,948,100 | A | 9/1999 | Hsu et al. |
| 5,961,629 | A | 10/1999 | Nguyen et al. |
| 5,964,868 | A | 10/1999 | Gochman et al. |
| 5,968,169 | A | 10/1999 | Pickett |
| 5,974,543 | A | 10/1999 | Hilgendorf et al. |
| 5,978,909 | A | 11/1999 | Lempel |
| 6,035,391 | A | 3/2000 | Isaman |
| 6,041,405 | A | 3/2000 | Green |
| 6,044,459 | A | 3/2000 | Bae et al. |
| 6,081,884 | A | 6/2000 | Miller |
| 6,085,311 | A | 7/2000 | Narayan et al. |
| 6,088,793 | A | 7/2000 | Liu et al. |
| 6,101,595 | A * | 8/2000 | Pickett et al. ............... 712/205 |
| 6,108,773 | A | 8/2000 | Col et al. |
| 6,122,729 | A | 9/2000 | Tran |
| 6,134,654 | A | 10/2000 | Patel et al. |
| 6,151,671 | A | 11/2000 | D'Sa et al. |
| 6,157,988 | A * | 12/2000 | Dowling .................... 711/140 |
| 6,170,054 | B1 | 1/2001 | Poplingher |
| 6,175,897 | B1 | 1/2001 | Ryan et al. |
| 6,185,676 | B1 | 2/2001 | Poplingher et al. |
| 6,233,676 | B1 | 5/2001 | Henry et al. |
| 6,250,821 | B1 | 6/2001 | Schwendinger |
| 6,256,727 | B1 | 7/2001 | McDonald |
| 6,260,138 | B1 | 7/2001 | Harris |
| 6,279,105 | B1 | 8/2001 | Konigsburg et al. |
| 6,279,106 | B1 | 8/2001 | Roberts |
| 6,308,259 | B1 | 10/2001 | Witt |
| 6,314,514 | B1 | 11/2001 | McDonald |
| 6,321,321 | B1 | 11/2001 | Johnson |
| 6,351,796 | B1 | 2/2002 | McCormick et al. |
| 6,374,350 | B1 | 4/2002 | D'Sa et al. |
| 6,457,120 | B1 | 9/2002 | Sinharoy |
| 6,502,185 | B1 | 12/2002 | Keller et al. |
| 6,560,696 | B1 | 5/2003 | Hummel et al. |
| 6,601,161 | B1 | 7/2003 | Rappoport et al. |
| 6,647,467 | B1 | 11/2003 | Dowling |
| 6,725,357 | B1 | 4/2004 | Cousin |
| 6,748,441 | B1 | 6/2004 | Gemmell |
| 6,754,808 | B1 | 6/2004 | Roth et al. |
| 6,823,444 | B1 | 11/2004 | Henry et al. |
| 6,886,093 | B1 | 4/2005 | Henry |
| 6,895,498 | B1 | 5/2005 | McDonald et al. |
| 6,898,699 | B1 | 5/2005 | Jourdan et al. |
| 6,968,444 | B1 | 11/2005 | Kroesche et al. |
| 2002/0188833 | A1 | 12/2002 | Henry et al. |
| 2002/0194460 | A1 | 12/2002 | Henry et al. |
| 2002/0194461 | A1 | 12/2002 | Henry et al. |
| 2002/0194464 | A1 | 12/2002 | Henry et al. |
| 2004/0030866 | A1 | 2/2004 | McDonald |
| 2004/0139281 | A1 | 7/2004 | McDonald |
| 2004/0139292 | A1 | 7/2004 | McDonald |
| 2004/0139301 | A1 | 7/2004 | McDonald |
| 2004/0143709 | A1 | 7/2004 | McDonald |
| 2004/0143727 | A1 | 7/2004 | McDonald |
| 2005/0044343 | A1 | 2/2005 | Henry et al. |
| 2005/0076193 | A1 | 4/2005 | Henry et al. |
| 2005/0114636 | A1 | 5/2005 | McDonald et al. |
| 2005/0132175 | A1 | 6/2005 | Henry et al. |
| 2005/0198479 | A1 | 9/2005 | Bean et al. |
| 2005/0198481 | A1 | 9/2005 | Henry et al. |

OTHER PUBLICATIONS

*Microprocessor Report*. Aug. 23, 1999. p. 7.

Yeh et al. *Alternative Implementation of Two-Level Adaptive Branch Prediction*. 19th Annual International Symposium on Computer Architecture. pp. 124-134. May 19-21, 1992. Gold Coast, Australia.

Chang et al. *Alternative Implementations of Hybrid Branch Predictors*. Proceedings of MICRO-28. 1995. IEEE.

Mc Farling, Scott. *WRL Technical Note TN-36*. Combining Branch Predictors. Jun. 1993. Western Research Laboratory, 250 University Ave., Palo Alto, CA 94301.

Bray et al. *Strategies For Branch Target Buffers*. Technical Report No. CSL-TR-91-480. Jun. 1991.

Sakamoto et al. *Microarchitecture Support for Reducing Branch Penalty in a Superscaler Processor*. pp. 208-216. Mittsubishi Electric Corp. 4-1 Mizuhara, Itami, Hyogo 664. Japan, 1996. IEEE.

IEEE 100, The Authoritative Dictionary of IEEE Standard Terms, Seventh Edition. The Institute of Electrical Engineering, Inc. New York: Standards Information Network IEEE, Press Page 135.

Online Computing Dictionary. http://instantweb.com/d/dictionary/foldoc.cgi?query=btb May 5, 1995. Branch Target Buffer.

The O Laich, Play-Hookey Web Page, Oct. 10, 1999.

Patterson et al. "Computer Organization & Design: Teh Hardware/software Interface." Morgan Kaufmann Publishers, Inc. San Francisco, CA. 1998 p. 469.

Jimenez et al. "The Impact of Delay on the Design of Branch Predictors." 2000.

Eberly et al. "The Correlation Branch Target Address Cache" May 1998.

Patterson et al. "Computer Organization & Design: The Hardware/Software Interface." Morgan Kaufmann Publishers, Inc. San Francisco, CA. 1998 pp. 453-455.

IBM Technical Disclosure Bulletin NN9204269, "Return Address Stack Cache." Apr. 1992, pp. 269-271.

* cited by examiner

FIG. 1 Microprocessor

FIG. 2

*Early Queue*

FIG. 3

*Late Queue*

*Instruction Queue Timing - Scenario 1*

FIG. 5

*Instruction Queue Timing - Scenario 2*

APPARATUS AND METHOD FOR BUFFERING INSTRUCTIONS AND LATE-GENERATED RELATED INFORMATION USING HISTORY OF PREVIOUS LOAD/SHIFTS

PRIORITY INFORMATION

This application claims priority based on U.S. Provisional Application, Ser. No. 60/380,739, filed Apr. 26, 2002, entitled INSERTING LATE DATA INTO MIDDLE OF QUEUE STRUCTURES AFTER INITIAL CAPTURE USING HISTORY OF PREVIOUS LOAD/SHIFTS.

FIELD OF THE INVENTION

This invention relates in general to the field of microprocessor pipelining, and particularly to instruction buffering in pipelined microprocessors.

BACKGROUND OF THE INVENTION

Modern microprocessors are pipelined microprocessors. That is, they operate on several instructions at the same time, within different blocks or pipeline stages of the microprocessor. Hennessy and Patterson define pipelining as, "an implementation technique whereby multiple instructions are overlapped in execution." *Computer Architecture: A Quantitative Approach*, $2^{nd}$ edition, by John L. Hennessy and David A. Patterson, Morgan Kaufmann Publishers, San Francisco, Calif., 1996. They go on to provide the following excellent illustration of pipelining:

> A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe—instructions enter at one end, progress through the stages, and exit at the other end, just as cars would in an assembly line.

Synchronous microprocessors operate according to clock cycles. Typically, an instruction passes from one stage of the microprocessor pipeline to another each clock cycle. In an automobile assembly line, if the workers in one stage of the line are left standing idle because they do not have a car to work on, then the production, or performance, of the line is diminished. Similarly, if a microprocessor stage is idle during a clock cycle because it does not have an instruction to operate on—a situation commonly referred to as a pipeline bubble—then the performance of the processor is diminished.

In the present context, the various stages of a microprocessor pipeline may be logically grouped into two portions. The top portion fetches and decodes instructions to provide to the bottom portion, which executes the instructions. The top portion typically includes an instruction fetcher for fetching program instructions from memory. Because the time required to fetch instructions from system memory is relatively large, the top portion also includes an instruction cache for caching instructions fetched from memory to reduce subsequent instruction fetch time. The primary job of the upper pipeline stages is to have instructions available when the execution stages are ready to execute them.

One means commonly employed in the upper pipeline stages to avoid causing bubbles in the execution stages is to read ahead in the program and fetch multiple program instructions into an instruction buffer. The instruction buffer provides instructions to the execution stages when they are ready to execute them. Instruction buffers are often arranged as first-in-first-out memories, or queues.

The instruction buffering technique is particularly advantageous in the situation where one or more of the instructions to be needed by the execution stages is not present in the instruction cache. In this situation, the impact of the missing cache line may be reduced to the extent the instruction buffer supplies instructions to the execution stages while the memory fetch is performed.

The buffering technique is also useful in the situation where a branch instruction is present in the program. Modern microprocessors employ branch prediction logic to predict whether the branch instruction will be taken, and if so, to provide the target address of the branch instruction. If a branch instruction is predicted taken, instructions are fetched from the target address, rather than the next sequential fetch address, and provided to the instruction buffer.

Instruction buffering is also beneficial in situations in which some processing of the instructions must be performed before they can be provided to the execution stages. For example, in some processors the instruction set allows instructions to be a variable number of bytes in length. Consequently, the processor must decode a stream of instruction bytes and determine the type of the next instruction in order to determine its length. The beginning of each instruction is determined by the length of the preceding instruction. This process is commonly referred to as instruction formatting. Because instruction formatting requires some processing time, it is advantageous to format multiple instructions and buffer the formatted instructions in the upper portion of the pipeline so that formatted instructions are available to the executions stages when needed.

In addition to fetching instructions, the upper pipeline stages also generate information related to the fetched instructions, i.e., information besides the instruction bytes themselves, which the execution stages utilize when executing the instructions. An example is branch prediction-related information, which may be needed by the execution stages in order to update the branch prediction history or to correct for a mispredicted branch instruction. Another example is the length of the instruction, which must be determined in the case of processors that execute variable length instructions. The related information may be generated later than the clock cycle in which the instruction bytes are ready to be provided to the instruction buffer. However, the related information must be provided to the execution stages in sync with the instruction to which it is related.

One solution to this problem is to add another pipeline stage to give the related information time to be buffered and provided to the execution stages. However, this solution has the disadvantage of potentially diminishing performance. In particular, when branch instructions are mispredicted, the pipeline stages above the mispredicted branch instruction must be flushed of their instructions and instruction fetching must be resumed again at the mispredicted branch. The greater the number of stages that must be flushed, the greater the likelihood that bubbles will be introduced into the execution stages of the microprocessor pipeline. Hence, it is desirable to keep the number of pipeline stages as small as possible. Thus, a better solution to the problem is needed.

SUMMARY

The present invention solves the stated problem by receiving the related instruction information into a buffering apparatus one clock cycle later than the apparatus receives the instruction bytes. The apparatus includes a means for the related information to effectively bypass the buffer if the buffer is empty when the related instruction is loaded into it so that the related information can be provided to the execution stages during the same clock cycle in which it is generated. Accordingly, in attainment of the aforementioned object, it is a feature of the present invention to provide an apparatus for buffering instructions and related information in a pipelined microprocessor, wherein the related information is not available to the buffering apparatus until at least a clock cycle later than the instructions are available. The apparatus includes a first queue having a first plurality of entries each for storing an instruction. The apparatus also includes a second queue having a second plurality of entries corresponding to the first plurality of entries, each for storing information related to a corresponding instruction in the first queue. The apparatus also includes a plurality of control signals, coupled to the first queue, for loading, shifting, and holding the instructions in the first queue. The apparatus also includes a plurality of registers, coupled to receive the plurality of control signals, and to output one-clock-cycle-delayed versions of the plurality of control signals, for loading, shifting, and holding the related information in the second queue.

In another aspect, it is a feature of the present invention to provide an instruction buffer. The instruction buffer includes a plurality of muxed-registers, each for storing an instruction. The instruction buffer also includes a plurality of registered-muxes, each for storing information related to the instruction in a corresponding one of the plurality of muxed-registers. The instruction buffer also includes control logic, coupled to the plurality of muxed-registers, that generates a control signal for selectively loading the instruction into one of the plurality of muxed-registers. The instruction buffer also includes a register, coupled to receive a value on the control signal during a first clock cycle, and to output the value during a second clock cycle subsequent to the first clock cycle for selectively loading the related information in one of the plurality of registered-muxes corresponding to the one of the plurality of muxed-registers.

In another aspect, it is a feature of the present invention to provide a microprocessor. The microprocessor includes an instruction formatter for outputting a branch instruction during a first clock cycle. The microprocessor also includes control logic for generating information related to a prediction of the branch instruction during a second clock cycle subsequent to the first clock cycle. The microprocessor also includes an instruction buffer, coupled to the instruction formatter, that buffers the branch instruction during the first clock cycle, receives the information during the second clock cycle, selectively outputs the information during the second clock cycle if the instruction buffer was empty during the first clock cycle, and selectively buffers the information during the second clock cycle if the instruction buffer was not empty during the first clock cycle.

In another aspect, it is a feature of the present invention to provide a method for buffering instructions and related information in a microprocessor having a pipeline. The method includes loading an instruction into an instruction queue during a first clock cycle, and generating information related to the instruction during a second clock cycle subsequent to the first clock cycle. The method also includes determining whether the instruction is shifted out of the queue during the second clock cycle, and loading the related information into the queue during the second clock cycle if the instruction is not shifted out of the queue, and bypassing the queue during the second clock cycle to provide the related information along with the instruction to the pipeline if the instruction is shifted out of the queue.

In another aspect, it is a feature of the present invention to provide an instruction buffer. The instruction buffer includes a first multiplexer, having an output, a hold data input, a load data input coupled to receive an instruction during a first clock cycle, and a control input coupled to receive a first control signal. The first multiplexer selects the load data input if the control input is true and the hold data input otherwise. The instruction buffer also includes a first register, having an input coupled to the first multiplexer output, and an output coupled to the first multiplexer hold data input. The instruction buffer also includes a second register, having an input and an output. The instruction buffer also includes a second multiplexer, having an output coupled to the second register input, a hold data input coupled to the second register output, a load data input coupled to receive information related to the instruction during a second clock cycle subsequent to the first clock cycle, and a control input coupled to receive a second control signal. The second multiplexer selects the load input if the control input is true and the hold input otherwise. The instruction buffer also includes a third register, having an input coupled to receive the first control signal during the first clock cycle, and an output for generating the second control signal during the second clock cycle. Consequently, the instruction and the related information are output during the second clock cycle if the first control signal is true during the first clock cycle.

In another aspect, it is a feature of the present invention to provide a computer program product stored in a computer-readable medium selected from a group consisting of semiconductor memory, magnetic disk, and optical disk. The computer program product includes computer-readable program code for providing an apparatus for buffering instructions and related information in a pipelined microprocessor. The related information is not available to the buffering apparatus until at least a clock cycle later than the instructions are available. The program code includes first program code for providing a first queue, having a first plurality of entries each for storing an instruction. The program code also includes second program code for providing a second queue, having a second plurality of entries corresponding to the first plurality of entries, each for storing information related to a corresponding first queue instruction. The program code also includes third program code for providing a plurality of control signals, coupled to the first queue, for loading, shifting, and holding the instructions in the first queue. The program code also includes fourth program code for providing a plurality of registers, coupled to receive the plurality of control signals and to output one-clock-cycle-delayed versions of the plurality of control signals, for loading, shifting, and holding the related information in the second queue.

An advantage of the present invention is that it enables the use of an instruction buffer, or queue, while avoiding the need to add another pipeline stage, thereby potentially improving processor performance.

Other features and advantages of the present invention will become apparent upon study of the remaining portions of the specification and drawings.

DETAILED DESCRIPTION

Figure 1:
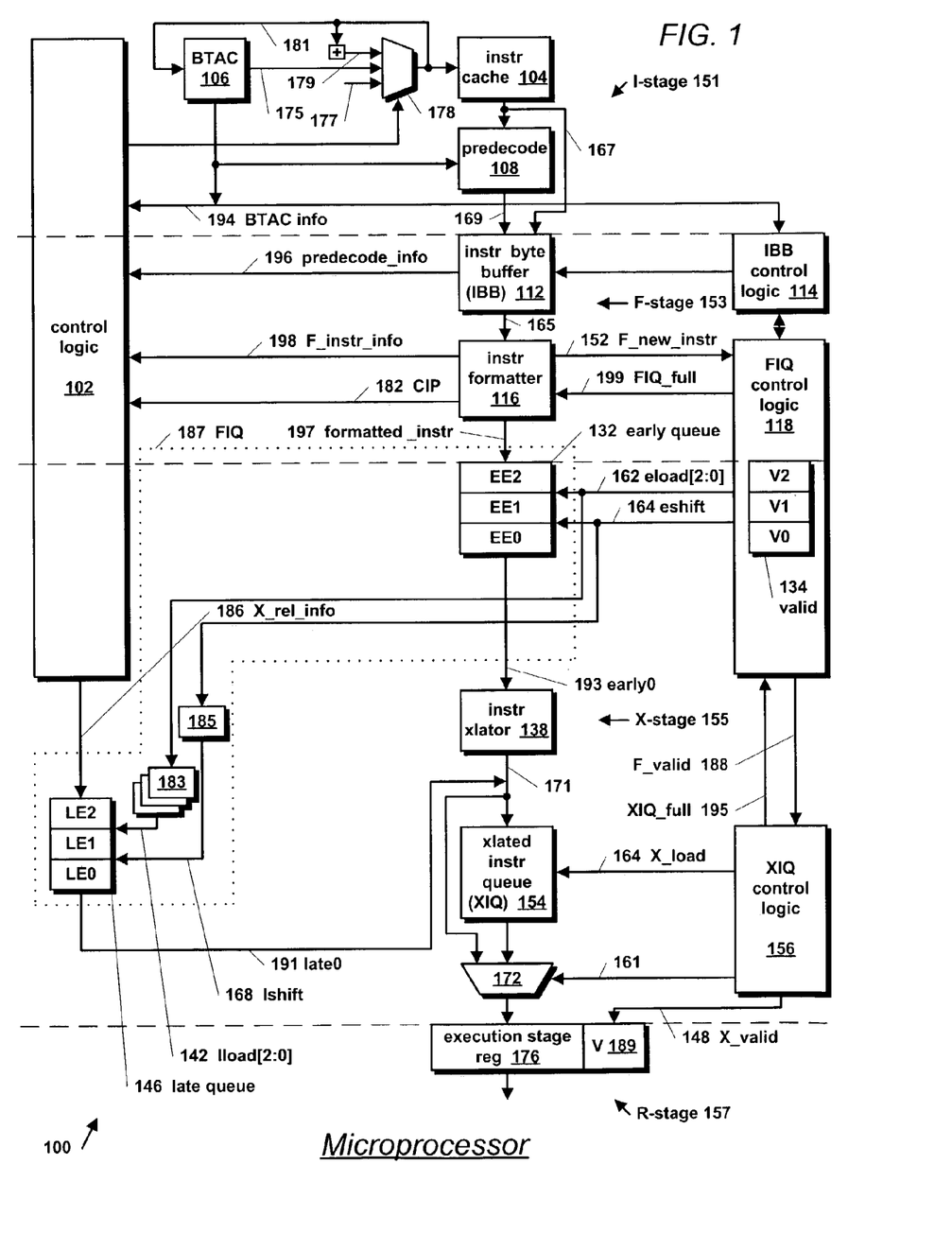
FIG. 1 is a block diagram of a microprocessor according to the present invention.

Referring now to FIG. 1, a block diagram of a microprocessor 100 according to the present invention is shown. Microprocessor 100 is a pipelined processor comprising multiple pipeline stages. A portion of the stages are shown, namely an I-stage 151, an F-stage 153, an X-stage 155, and an R-stage 157. I-stage 151 comprises a stage for fetching instruction bytes, either from memory or an instruction cache. In one embodiment, I-stage 151 includes a plurality of stages. F-stage 153 comprises a stage for formatting a stream of unformatted instruction bytes into formatted instructions. X-stage 155 comprises a stage for translating formatted macroinstructions into microinstructions. R-stage 157 comprises a register stage for loading operands from register files. Other execution stages of microprocessor 100 not shown, such as address generation, data, execute, store, and result write-back stages, follow R-stage 157.

Microprocessor 100 includes an instruction cache 104 in I-stage 151. Instruction cache 104 caches instructions fetched from a system memory coupled to microprocessor 100. Instruction cache 104 receives a current fetch address 181 for selecting a cache line of instruction bytes 167 to output. In one embodiment, instruction cache 104 is a multi-stage cache, i.e., instruction cache 104 requires multiple clock cycles to output a cache line in response to current fetch address 181.

Microprocessor 100 also includes a multiplexer 178 in I-stage 151. Multiplexer 178 provides current fetch address 181. Multiplexer 178 receives a next sequential fetch address 179, which is the current fetch address 181 incremented by the size of a cache line stored in instruction cache 104. Multiplexer 178 also receives a correction address 177, which specifies an address to which microprocessor 100 branches in order to correct a branch misprediction. Multiplexer 178 also receives a predicted branch target address 175.

Microprocessor 100 also includes a branch target address cache (BTAC) 106 in I-stage 151, coupled to multiplexer 178. BTAC 106 generates predicted branch target address 175 in response to current fetch address 181. BTAC 106 caches branch target addresses of executed branch instructions and the addresses of the branch instructions. In one embodiment, BTAC 106 comprises a 4-way set associative cache memory, and each way of a selected set contains multiple entries for storing a target address and branch prediction information for a predicted branch instruction. In addition to the predicted target address 175, BTAC 106 also outputs branch prediction related information 194. In one embodiment, the BTAC information 194 includes: an offset specifying the first byte of the predicted branch instruction within the instruction cache line selected by the current fetch address 181; an indication of whether the predicted branch instruction wraps across a half-cache line boundary; a valid bit for each entry in the selected way; an indication of which way in the selected set is least-recently-used; an indication of which of the multiple entries in the selected way is least-recently-used; and a prediction of whether the branch instruction will be taken or not taken.

Microprocessor 100 also includes control logic 102. If the current fetch address 181 matches a valid cached address in BTAC 106 of a previously executed branch instruction, and BTAC 106 predicts the branch instruction will be taken, then control logic 102 controls multiplexer 178 to select BTAC target address 175. If a branch misprediction occurs, control logic 102 controls multiplexer 178 to select correction address 177. Otherwise, control logic 102 controls multiplexer 178 to select next sequential fetch address 179. Control logic 102 also receives BTAC information 194.

Microprocessor 100 also includes predecode logic 108 in I-stage 151, coupled to instruction cache 104. Predecode logic 108 receives a cache line of instruction bytes 167, provided by instruction cache 104, and BTAC information 194, and generates predecode information 169 based thereon. In one embodiment, the predecode information 169 includes: a bit associated with each instruction byte predicting whether the byte is the opcode byte of a branch instruction predicted taken by BTAC 106; bits for predicting the length of the next instruction, based on the predicted instruction length; a bit associated with each instruction byte predicting whether the byte is a prefix byte of the instruction; and a prediction of the outcome of a branch instruction.

Microprocessor 100 also includes an instruction byte buffer 112 in F-stage 153, coupled to predecode logic 108. Instruction byte buffer 112 receives predecode information 169 from predecode logic 108 and instruction bytes 167 from instruction cache 104. Instruction byte buffer 112 provides the predecode information to control logic 102 via signal 196. In one embodiment, instruction byte buffer 112 is capable of buffering up to four cache lines of instruction bytes and associated predecode information.

Microprocessor 100 also includes instruction byte buffer control logic 114, coupled to instruction byte buffer 112. Instruction byte buffer control logic 114 controls the flow of instruction bytes and associated predecode information into and out of instruction byte buffer 112. Instruction byte buffer control logic 114 also receives BTAC info 194.

Microprocessor 100 also includes an instruction formatter 116 in F-stage 153, coupled to instruction byte buffer 112. Instruction formatter 116 receives instruction bytes and predecode information 165 from instruction byte buffer 112 and generates formatted instructions 197 therefrom. That is, instruction formatter 116 views a string of instruction bytes in instruction byte buffer 112, determines which of the bytes comprise the next instruction and the length of the next instruction, and outputs the next instruction as formatted_instr 197. In one embodiment, formatted instructions provided on formatted_instr 197 comprise instructions conforming substantially to the x86 architecture instruction set. In one embodiment, the formatted instructions are also referred to as macroinstructions that are translated into microinstructions that are executed by the execution stages of the microprocessor 100 pipeline. Formatted_instr 197 is generated in F-stage 153. Each time instruction formatter 116 outputs a formatted_instr 197, instruction formatter 116 generates a true signal on a signal F_new_instr 152 to indicate the presence of a valid formatted instruction on formatted_instr 197. Additionally, instruction formatter 116 outputs information related to formatted_instr 197 on signal F_instr_info 198, which is provided to control logic 102. In one embodiment, F_instr_info 198 includes: a prediction, if the instruction is a branch instruction, of whether a branch instruction is taken or not taken; a prefix of the instruction; whether the address of the instruction hit in a branch target buffer of the microprocessor; whether the instruction is a far direct branch instruction; whether the instruction is a far indirect branch instruction; whether the instruction is a call branch instruction; whether the instruction is a return branch instruction; whether the instruction is a far return branch instruction; whether the instruction is an unconditional branch instruction; and whether the instruction is a conditional branch instruction. Furthermore, instruction formatter 116 outputs the address of the formatted instruction on current instruction pointer (CIP) signal 182, which is equal to the address of the previous instruction plus the length of the previous instruction.

Microprocessor 100 also includes a formatted instruction queue (FIQ) 187 in X-stage 155. Formatted instruction queue 187 receives formatted_instr 197 from instruction formatter 116. Formatted instruction queue 187 also outputs a formatted instruction on an early0 signal 193. In addition, formatted instruction queue 187 receives from control logic 102 information related to the formatted instructions received on formatted_instr 197 via a signal X_rel_info 186. X_rel_info 186 is generated in X-stage 155. Formatted instruction queue 187 also outputs on a late0 signal 191 information related to the formatted instruction which it outputs on early0 signal 193. Formatted instruction queue 187 and X_rel_info 186 will be described in more detail below.

Figure 2:
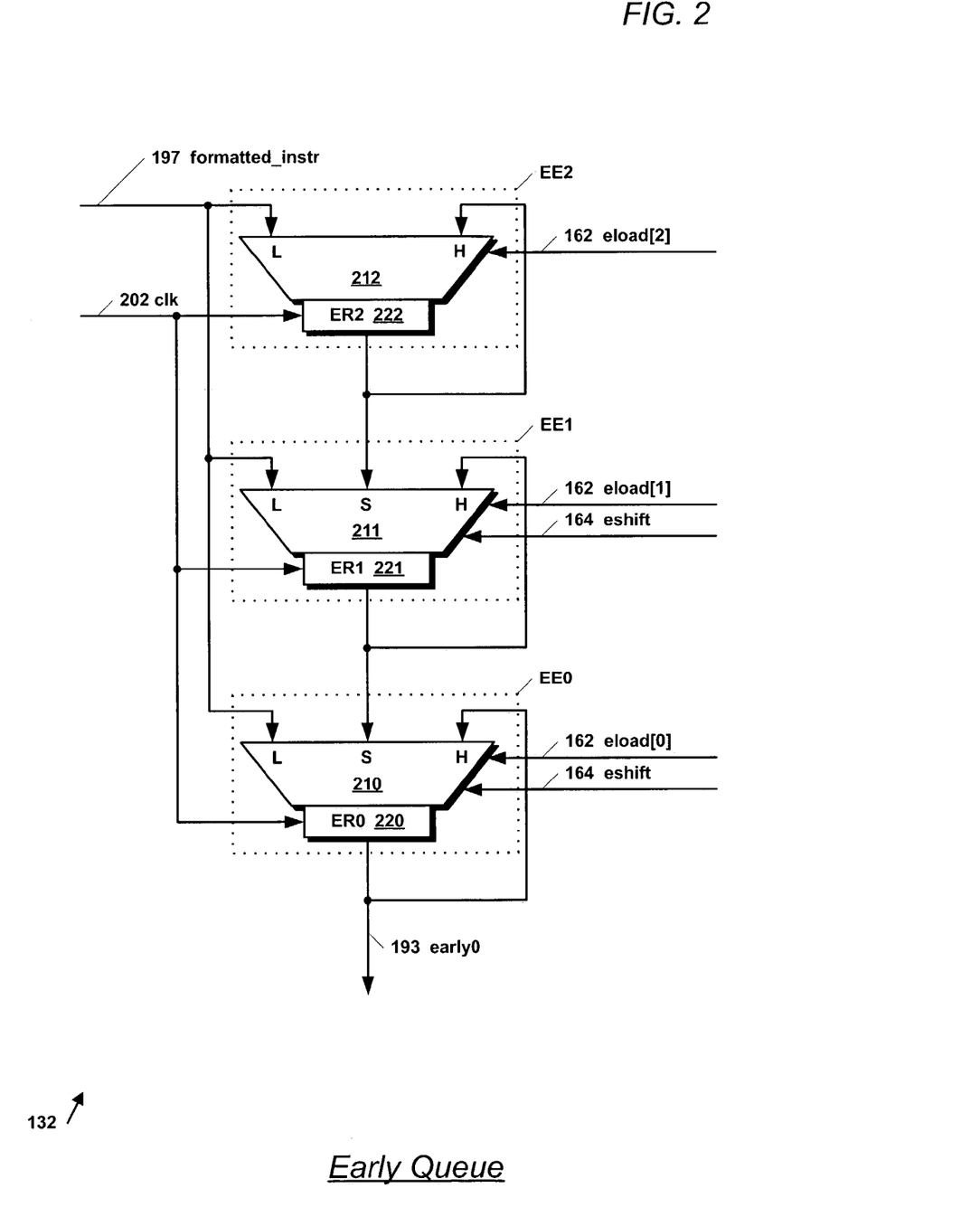
FIG. 2 is a block diagram illustrating the early queue of the formatted instruction queue of FIG. 1 according to the present invention.
Figure 3:
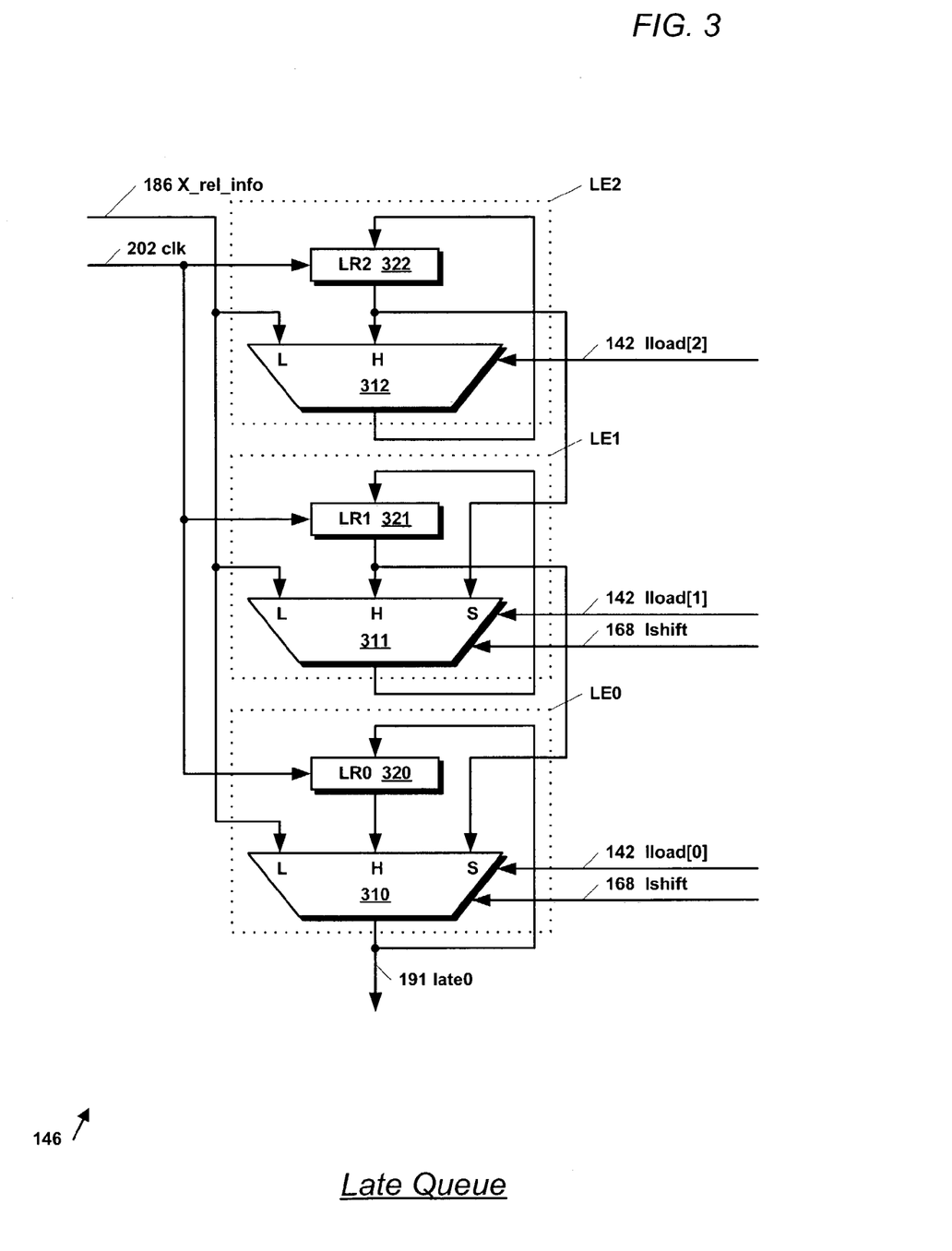
FIG. 3 is a block diagram illustrating the late queue of the formatted instruction queue of FIG. 1 according to the present invention.

Microprocessor 100 also includes formatted instruction queue (FIQ) control logic 118. FIQ control logic 118 receives F_new_instr 152 from instruction formatter 116. FIQ control logic 118 generates a true value on an FIQ_full signal 199, which is provided to instruction formatter 116, when formatted instruction queue 187 is full. FIQ control logic 118 also generates an eshift signal 164 for controlling shifting of instructions within formatted instruction queue 187. FIQ control logic 118 also generates a plurality of eload signals 162 for controlling loading an instruction from formatted_instr 197 into an empty entry of formatted instruction queue 187. In one embodiment, FIQ control logic 118 generates one eload signal 162 for each entry in formatted instruction queue 187. In one embodiment, formatted instruction queue 187 comprises 12 entries, each for storing a formatted macroinstruction. However, for simplicity and clarity, FIGS. 1 through 3 show formatted instruction queue 187 comprising three entries; hence, FIG. 1 shows three eload signals 162, denoted eload[2:0] 162.

FIQ control logic 118 also maintains a valid bit 134 for each entry in formatted instruction queue 187. The embodiment shown in FIG. 1 includes three valid bits 134 denoted, V2, V1, and V0. V0 134 corresponds to the valid bit for the lowest entry in formatted instruction queue 187; V1 134 corresponds to the valid bit for the middle entry in formatted instruction queue 187; V2 134 corresponds to the valid bit for the highest entry in formatted instruction queue 187. FIQ control logic 118 also outputs an F_valid signal 188, which is V0 134 in one embodiment. Valid bits 134 indicate whether a corresponding entry in formatted instruction queue 187 contains a valid instruction. FIQ control logic 118 also receives an XIQ_full signal 195.

Microprocessor 100 also includes an instruction translator 138 in X-stage 155, coupled to formatted instruction queue 187. Instruction translator 138 receives a formatted instruction on early0 signal 193 from formatted instruction queue 187 and translates the formatted macroinstruction into one or more microinstructions 171. In one embodiment, microprocessor 100 includes a reduced instruction set computer (RISC) core that executes microinstructions of the native, or reduced, instruction set.

Microprocessor 100 also includes a translated instruction queue (XIQ) 154 in X-stage 155, coupled to instruction translator 138. XIQ 154 buffers translated microinstructions 171 received from instruction translator 138. XIQ 154 also buffers the related information received from formatted instruction queue 187 via late0 signal 191. The information received via late0 signal 191 is related to the microinstructions 171 because it is related to the formatted macroinstructions from which the microinstructions 171 were translated. The related information 191 is used by execution stages of microprocessor 100 to execute the related microinstructions 171.

Microprocessor 100 also includes XIQ control logic 156, coupled to XIQ 154. XIQ control logic 156 receives F_valid signal 188 and generates XIQ_full signal 195. XIQ control logic 156 also generates X_load signal 164 to control loading translated microinstructions 171 and related information 191 into XIQ 154.

Microprocessor 100 also includes a two-input multiplexer 172 in X-stage 155, coupled to XIQ 154. Multiplexer 172 operates as a bypass multiplexer to selectively bypass XIQ 154. Multiplexer 172 receives the output of XIQ 154 on one input. Multiplexer 172 receives the input to XIQ 154, i.e., microinstruction 171 and late0 191, on the other input. Multiplexer 172 selects one of its inputs to output to an execution stage register 176 in R-stage 157 based on a control input 161 generated by XIQ control logic 156. If execution stage register 176 is ready to receive an instruction and XIQ 154 is empty when instruction translator 138 outputs microinstruction 171, then XIQ control logic 156 controls multiplexer 172 to bypass XIQ 154. Microprocessor 100 also includes a valid bit register 189 that receives an X_valid signal 148 from XIQ control logic 156 to indicate whether the microinstruction and related information stored in execution stage register 176 is valid.

Formatted instruction queue 187 comprises an early queue 132 for storing formatted macroinstructions received via formatted_instr signal 197 and a corresponding late queue 146 for storing related information received via X_rel_info signal 186. FIG. 1 shows early queue 132 comprising three entries, denoted EE2, EE1, and EE0. EE0 is the bottom entry of early queue 132, EE1 is the middle entry of early queue 132, and EE2 is the top entry of early queue 132. The contents of EE0 is provided on output signal early0 193. Signals eshift 164 and eload[2:0] 162 control the shifting and loading of early queue 132. Similarly, FIG. 1 shows late queue 146 comprising three entries, denoted LE2, LE1, and LE0. LE0 is the bottom entry of late queue 146, LE1 is the middle entry of late queue 146, and LE2 is the top entry of late queue 146. The contents of LE0 is provided on output signal late0 191.

Formatted instruction queue 187 also includes a register 185. Register 185 receives eshift signal 164 from FIQ control logic 118 at the end of a first clock cycle and on the next clock cycle outputs on an lshift signal 168 the value of eshift signal 164 received during the first clock cycle. Formatted instruction queue 187 also includes three registers 183. Registers 183 receive eload[2:0] signals 162 from FIQ control logic 118 at the end of a first clock cycle and on the next clock cycle output on lload[2:0] signals 142 the value of eload[2:0] signals 162 received during the first clock cycle. That is, registers 185 and 183 output a one-clock-cycle-delayed version of eshift signal 164 and eload[2:0] signals 162, respectively.

In one embodiment, X_rel_info 186 comprises: the length of the formatted macroinstruction from which the corresponding microinstruction was translated; an indication of whether the macroinstruction wrapped across a half-cache line boundary; a displacement field of the macroinstruction; an immediate field of the macroinstruction; the instruction pointer of the macroinstruction; and various information related to branch prediction and correction if the macroinstruction is predicted to be a branch instruction.

In one embodiment, the branch prediction and correction related information comprises: branch history table information used to predict whether the branch instruction will be taken or not taken; a portion of a linear instruction pointer of the branch instruction used to predict whether the branch instruction will be taken or not taken; a branch pattern exclusive-ORed with the linear instruction pointer to make the taken/not taken prediction; a second branch pattern for reverting to if the branch prediction is incorrect; various flags to indicate characteristics about the branch instruction, such as whether the branch instruction was a conditional branch instruction, a call instruction, the target of a return stack, a relative branch, an indirect branch, and whether the prediction of the branch instruction outcome was made by a static predictor; various information related to the prediction made by the BTAC 106, such as whether the current fetch address 181 matched a cached address in the BTAC 106, whether the matching address was valid, whether the branch instruction was predicted taken or not taken, the least-recently-used way of the set of the BTAC 106 selected by the current fetch address 181, which way of the selected set to replace if execution of the instruction requires the BTAC 106 to be updated, and the target address output by the BTAC 106. In one embodiment, a portion of X_rel_info 186 is generated during prior clock cycles and stored for provision along with the related information generated during the clock cycle after the macroinstruction is provided from entry EE0 of early queue 132 on early0 signal 193.

Referring now to FIG. 2, a block diagram illustrating early queue 132 of formatted instruction queue 187 of FIG. 1 according to the present invention is shown.

Early queue 132 includes three muxed-registers connected in serial to form a queue. The three muxed registers comprise entries EE2, EE1, and EE0 of FIG. 1.

The top muxed-register in early queue 132 comprises a two-input mux 212 and a register 222, denoted ER2, that receives the output of mux 212. Mux 212 includes a load input that receives formatted_instr signal 197 of FIG. 1. Mux 212 also includes a hold input that receives the output of register ER2 222. Mux 212 receives eload[2] signal 162 of FIG. 1 as a control input. If eload[2] 162 is true, mux 212 selects formatted instr signal 197 on the load input; otherwise, mux 212 selects the output of register ER2 222 on the hold input. Register ER2 222 loads the value of the output of mux 212 on the rising edge of a clock signal denoted clk 202.

The middle muxed-register in early queue 132 comprises a three-input mux 211 and a register 221, denoted ER1, that receives the output of mux 211. Mux 211 includes a load input that receives formatted_instr signal 197. Mux 211 also includes a hold input that receives the output of register ER1 221. Mux 211 also includes a shift input that receives the output of register ER2 222. Mux 211 receives eload[1] signal 162 of FIG. 1 as a control input. Mux 211 also receives eshift signal 164 of FIG. 1 as a control input. If eload[1] 162 is true, mux 211 selects formatted_instr signal 197 on the load input; or else if eshift signal 164 is true, mux 211 selects the output of register ER2 222 on the shift input; otherwise, mux 211 selects the output of register ER1 221 on the hold input. Register ER1 221 loads the value of the output of mux 211 on the rising edge of clk 202.

The bottom muxed-register in early queue 132 comprises a three-input mux 210 and a register 220, denoted ER0, that receives the output of mux 210. Mux 210 includes a load input that receives formatted_instr signal 197. Mux 210 also includes a hold input that receives the output of register ER0 220. Mux 210 also includes a shift input that receives the output of register ER1 221. Mux 210 receives eload[0] signal 162 of FIG. 1 as a control input. Mux 210 also receives eshift signal 164 of FIG. 1 as a control input. If eload[0] 162 is true, mux 210 selects formatted_instr signal 197 on the load input; or else if eshift signal 164 is true, mux 210 selects the output of register ER1 221 on the shift input; otherwise, mux 210 selects the output of register ER0 220 on the hold input. Register ER0 220 loads the value of the output of mux 210 on the rising edge of clk 202. The output of register ER0 220 is provided on early0 signal 193.

Referring now to FIG. 3, a block diagram illustrating late queue 146 of formatted instruction queue 187 of FIG. 1 according to the present invention is shown.

Late queue 146 includes three registered-muxes connected in serial to form a queue. The three registered-muxes comprise entries LE2, LE1, and LE0 of FIG. 1.

The top registered-mux in late queue 146 comprises a two-input mux 312 and a register 322, denoted LR2, that receives the output of mux 312. Mux 312 includes a load input that receives X_rel_info 186 of FIG. 1. Mux 312 also includes a hold input that receives the output of register LR2 322. Mux 312 receives lload[2] signal 142 of FIG. 1 as a control input. If lload[2] 142 is true, mux 312 selects X_rel_info 186 on the load input; otherwise, mux 312 selects the output of register LR2 322 on the hold input. Register LR2 322 loads the value of the output of mux 312 on the rising edge of clk 202 of FIG. 2.

The middle registered-mux in late queue 146 comprises a three-input mux 311 and a register 321, denoted LR1, that receives the output of mux 311. Mux 311 includes a load input that receives X_rel_info 186. Mux 311 also includes a hold input that receives the output of register LR1 321. Mux 311 also includes a shift input that receives the output of register LR2 322. Mux 311 receives lload[1] signal 142 of FIG. 1 as a control input. If lload[1] 142 is true, mux 311 selects X_rel_info 186 on the load input; or else if lshift 168 is true, mux 311 selects the output of register LR2 322; otherwise, mux 311 selects the output of register LR1 321 on the hold input. Register LR1 321 loads the value of the output of mux 311 on the rising edge of clk 202 of FIG. 2.

The bottom registered-mux in late queue 146 comprises a three-input mux 310 and a register 320, denoted LR0, that receives the output of mux 310. Mux 310 includes a load input that receives X_rel_info 186. Mux 310 also includes a hold input that receives the output of register LR0 320. Mux 310 also includes a shift input that receives the output of register LR1 321. Mux 310 receives lload[0] signal 142 of FIG. 1 as a control input. If lload[0] 142 is true, mux 310 selects X_rel_info 186 on the load input; or else if lshift 168 is true, mux 310 selects the output of register LR1 321; otherwise, mux 310 selects the output of register LR0 320 on the hold input. Register LR0 320 loads the value of the output of mux 310 on the rising edge of clk 202 of FIG. 2. The output of mux 310 is provided on late0 signal 291 of FIG. 1.

Figure 4:
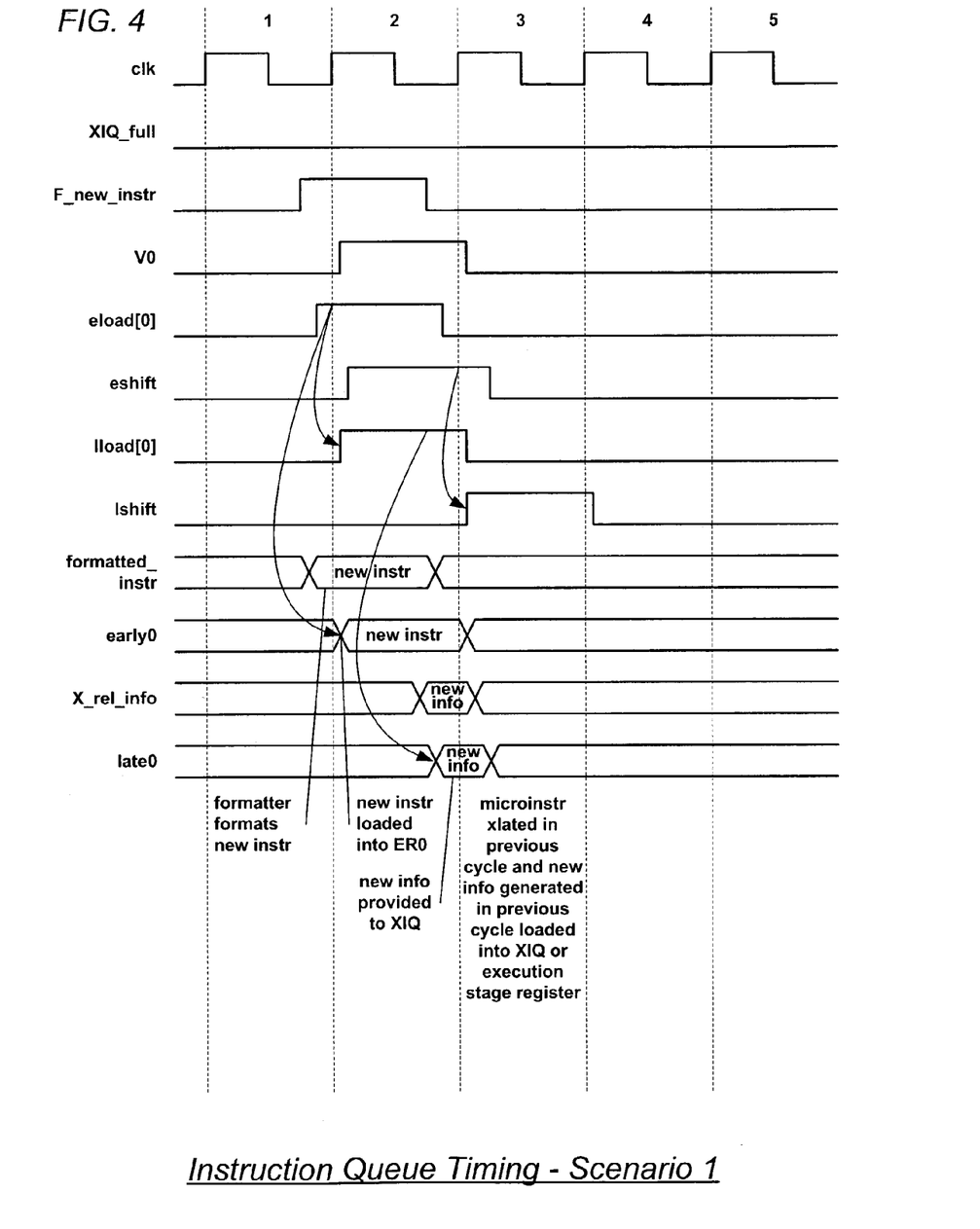
FIGS. 4, 5, and 6 are timing diagrams illustrating operation of the formatted instruction queue of FIG. 1 according to the present invention.

Referring now to FIG. 4, a timing diagram illustrating operation of formatted instruction queue 187 of FIG. 1 according to the present invention is shown. FIG. 4 shows five clock cycles each beginning with the rising edge of elk signal 202 of FIGS. 2 and 3. By convention, true signal values are shown as high logic levels in FIG. 4. FIG. 4 illustrates a scenario in which at the time instruction formatter 116 generates a new formatted macroinstruction, XIQ 154 of FIG. 1 is not full, i.e., is able to receive a microinstruction from the instruction formatter 116, and formatted instruction queue 187 is empty.

During clock cycle 1, instruction formatter 116 generates a true value on F_new_instr signal 152 of FIG. 1 to indicate a valid new formatted macroinstruction is present on formatted_instr 197 of FIG. 1, as shown. Because formatted instruction queue 187 is empty, FIQ control logic 118 of FIG. 1 generates a true value on eload[0] signal 162 to load the valid new formatted macroinstruction from formatted_instr 197 into EE0, which is the lowest empty entry in formatted instruction queue 187.

During clock cycle 2, V0 134 of FIG. 1, the valid bit for formatted instruction queue 187 entry EE0, is set to indicate that EE0 contains a valid instruction. On the rising edge of clock cycle 2, one of registers 183 of FIG. 1 loads eload[0] 162 and outputs a true value on lload[0] 142. Because eload[0] 162 is true, the new instruction is loaded into ER0 220 and output on early0 signal 193 of FIG. 1, as shown, for provision to instruction translator 138 of FIG. 1. Instruction translator 138 translates the new macroinstruction and provides the translated microinstruction 171 to XIQ 154. In addition, control logic 102 generates new information related to the new instruction on X_rel_info 186, a shown. Because lload[0] 142 is true, mux 310 selects the load input, and outputs on late0 191 the new related information provided on X_rel_info 186, as shown, for provision to XIQ 154 and mux 172 of FIG. 1. Furthermore, FIQ control logic 118 generates a true value on eshift signal 164 of FIG. 1 so that the instruction will be shifted out of formatted instruction queue 187 during clock cycle 3, since the instruction translator 138 translates the new instruction during clock cycle 2.

During clock cycle 3, V0 134 is false since the new instruction is shifted out of formatted instruction queue 187. On the rising edge of clock cycle 3, XIQ control logic 156 loads the translated microinstruction 171 and related instruction information provided on late0 191 into either execution stage register 176 or XIQ 154, depending upon whether XIQ 154 is empty or non-empty, respectively. Additionally, register 185 of FIG. 1 loads eshift signal 164 and outputs a true value on lshift 168.

As may be observed from FIG. 4, although the new macroinstruction is generated during clock cycle 1 but the related information is not generated until clock cycle 2, formatted instruction queue 187 advantageously enables the related information and translated microinstruction to be provided to the execution stage during the same clock cycle.

Figure 5:
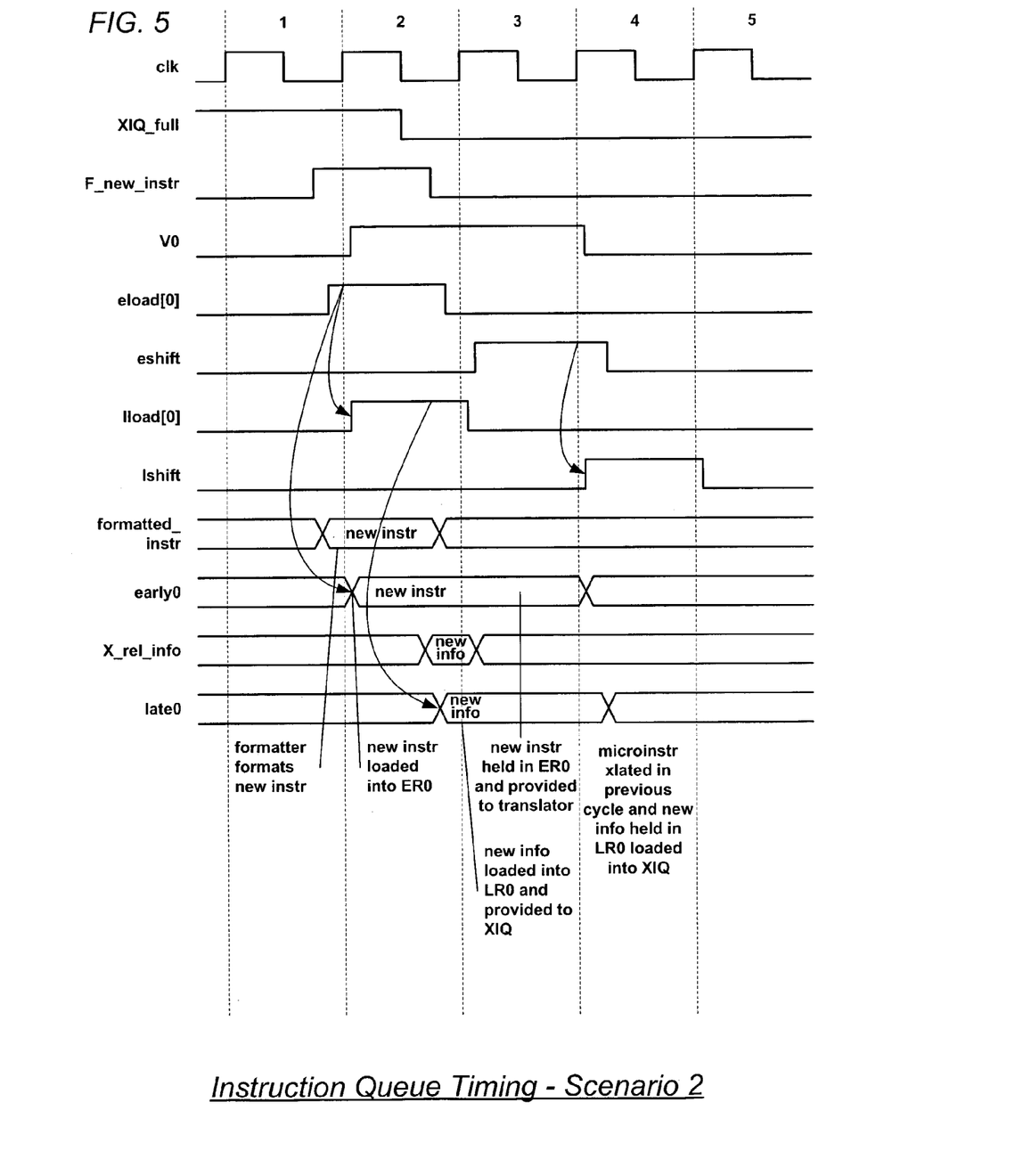

Referring now to FIG. 5, a timing diagram illustrating operation of formatted instruction queue 187 of FIG. 1 according to the present invention is shown. FIG. 5 is similar to FIG. 4, except XIQ 154 is full when instruction formatter 116 generates a new formatted macroinstruction in the scenario of FIG. 5.

During clock cycle 1, XIQ_full 195 is true. Instruction formatter 116 generates a new instruction on formatted_instr 197 and F_new_instr 152 is true, as in FIG. 4. Because formatted instruction queue 187 is empty, FIQ control logic 118 generates a true value on eload[0] signal 162 to load the valid new formatted macroinstruction from formatted_instr 197 into EE0, as in FIG. 4.

During clock cycle 2, V0 134 is set; register 183 outputs a true value on lload[0] 142; the new instruction is loaded into ER0 220 and output on early0 signal 193 for provision to instruction translator 138; new information related to the new instruction is generated on X_rel_info 186; and mux 310 selects the load input, and outputs on late0 191 the new related information provided on X_rel_info 186 for provision to XIQ 154 and mux 172; as in FIG. 4. However, since XIQ 154 is full at the start of clock cycle 2, FIQ control logic 118 generates a false value on eshift signal 164, unlike in FIG. 4. XIQ control logic 156 subsequently deasserts XIQ_full 195 to indicate that instruction translator 138 will be ready to translate a new macroinstruction during clock cycle 3.

During clock cycle 3, as a consequence of eshift signal 164 being false at the rising edge of elk 202, the new instruction is held in ER0 220 and provided to instruction translator 138 on early0 193 for translation. Commensurately, V0 134 remains true. Instruction translator 138 translates the new macroinstruction and provides the translated microinstruction 171 to XIQ 154. Because lload[0] 142 is true at the rising edge of clk 202, the related information provided on X_rel_info 186 during clock cycle 2 is loaded into LR0 320. Because lload[0] 142 and lshift 168 are false during the remainder of clock cycle 3, the contents of LR0 320, i.e., the new information related to the instruction, is provided to XIQ 154 on late0 191, as shown. After the start of clock cycle 3, FIQ control logic 118 generates a true value on eshift signal 164 so that the new instruction will be shifted out of formatted instruction queue 187 during clock cycle 4.

During clock cycle 4, V0 134 is false since the new instruction is shifted out of formatted instruction queue 187. On the rising edge of clock cycle 4, XIQ control logic 156 loads the translated microinstruction 171 and related instruction information provided on late0 191 into XIQ 154. Additionally, register 185 of FIG. 1 loads eshift signal 164 and outputs a true value on lshift 168.

As may be observed from FIG. 5, although the new macroinstruction is generated during clock cycle 1 but the related information is not generated until clock cycle 2, formatted instruction queue 187 advantageously enables the related information and translated microinstruction to be provided to the XIQ 154 during the same clock cycle.

Figure 6:
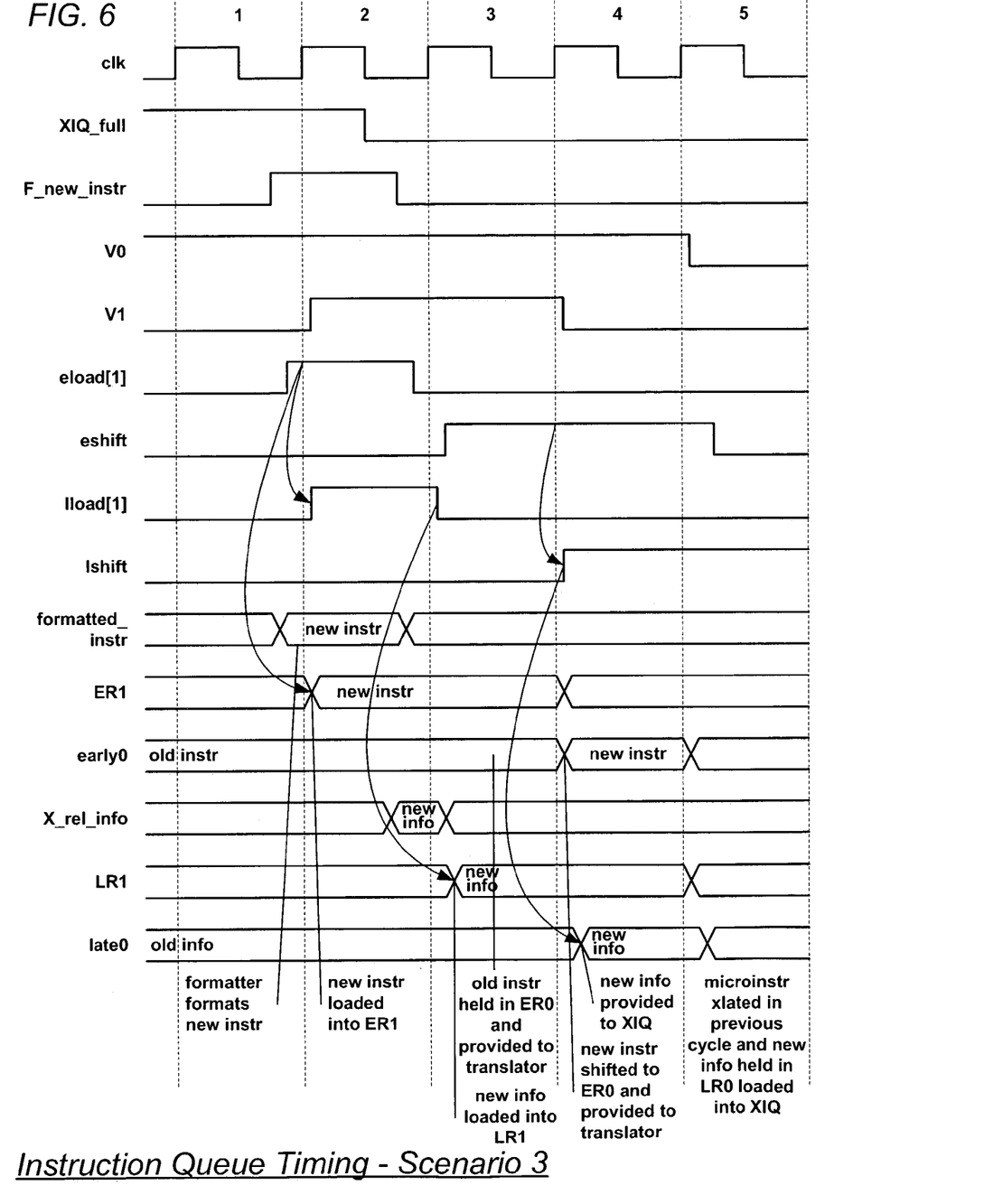

Referring now to FIG. 6, a timing diagram illustrating operation of formatted instruction queue 187 of FIG. 1 according to the present invention is shown. FIG. 6 is similar to FIG. 5, except in the scenario of FIG. 6 when instruction formatter 116 generates a new formatted macroinstruction, formatted instruction queue 187 is not empty, in addition to the XIQ 154 being full.

During clock cycle 1, XIQ_full 195 is true. Instruction formatter 116 generates a new instruction on formatted_instr 197 and F_new_instr 152 is true, as in FIGS. 4 and 5. V0 134 is true since EE0 contains a valid instruction; however, V1 134, the valid bit for formatted instruction queue 187 entry EE1 of FIG. 1, is false, as shown, since EE1 does not contain a valid instruction. Consequently, FIQ control logic 118 generates a true value on eload[1] signal 162 to load the valid new formatted macroinstruction from formatted_instr 197 into EE1. Signal early0 193 provides the instruction held in EE0, referred to in FIG. 6 as old instr, and signal late0 191 provides the information related to the old instruction held in LE0, referred to as old info, as shown.

During clock cycle 2, V1 134 is set to indicate that EE1 now contains a valid instruction. V0 134 also remains set. The old instr is held in ER0 220 and the old info is held in LR0 320. Register 183 outputs a true value on lload[1] 142. The new instruction is loaded into ER1 221, as shown. The new information related to the new instruction is generated on X_rel_info 186, and mux 311 of FIG. 3 selects the load input, which is provided to register LR1 321. Since XIQ 154 is full at the start of clock cycle 2, FIQ control logic 118 generates a false value on eshift signal 164. XIQ control logic 156 subsequently deasserts XIQ_full 195 to indicate that instruction translator 138 will be ready to translate a new macroinstruction during clock cycle 3.

During clock cycle 3, as a consequence of eshift signal 164 being false at the rising edge of clk 202, the new instruction is held in ER1 221. Additionally, the old instr is held in ER0 220 and provided to instruction translator 138 on early0 193 for translation. V1 and V0 134 remain true. Instruction translator 138 translates the old instr and provides its translated microinstruction 171 to XIQ 154. Because lload[0] 142 and lshift 168 are false during the remainder of clock cycle 3, the contents of LR0 320, i.e., the old info related to the old instr, is provided to XIQ 154 on late0 191, as shown. Because lload[1] 142 is true at the rising edge of clk 202, the new related information provided on X_rel_info 186 during clock cycle 2 is loaded into LR1 321. After the start of clock cycle 3, FIQ control logic 118 generates a true value on eshift signal 164 so that the new instruction will be shifted from EE1 to EE0 during clock cycle 4.

During clock cycle 4, V1 134 is false since the new instruction is shifted from EE1 to EE0. On the rising edge of clock cycle 4, XIQ control logic 156 loads the microinstruction 171 translated from old instr and related instruction information provided on late0 191 into XIQ 154. Additionally, register 185 loads eshift signal 164 and outputs a true value on lshift 168. Eshift 164 remains true since XIQ 154 is ready to receive another microinstruction. As a consequence of eshift signal 164 being true at the rising edge of clk 202, the new instruction is shifted from ER1 221 to ER0 220 and provided to instruction translator 138 on early0 193 for translation. V0 134 remains true. Instruction translator 138 translates the new instruction and provides the microinstruction 171 translated from the new instruction to XIQ 154. Because lshift 168 is true during clock cycle 4, the information related to the new instruction held in LR1 321 is selected on the shift input of mux 310 and provided on late0 signal 191, as shown.

During clock cycle 5, FIQ control logic 118 clears V0 134 since the new instruction is shifted out of formatted instruction queue 187. On the rising edge of clock cycle 5, XIQ control logic 156 loads the microinstruction 171 translated from the new instruction and related instruction information provided on late0 191 into XIQ 154.

As may be observed from FIG. 6, although the new macroinstruction is generated during clock cycle 1 but the related information is not generated until clock cycle 2, formatted instruction queue 187 advantageously enables the related information and translated microinstruction to be provided to the XIQ 154 during the same clock cycle.

Although the present invention and its objects, features, and advantages have been described in detail, other embodiments are encompassed by the invention. For example, although embodiments have been described with respect to buffering macroinstructions for provision to an instruction translator for translation into microinstructions, the invention is not limited to such embodiments; rather the invention can be employed broadly to any situation in which instructions need to be buffered, and information related to the instructions is generated in a clock cycle subsequent to the clock cycle in which the instructions themselves are generated. Furthermore, although embodiments have been described in the context of a microprocessor that processes variable length instructions, the invention is not limited thereto, but may be employed in fixed-length instruction processors.

In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. An apparatus for buffering instructions and related information in a pipelined microprocessor, wherein the related information is not available to the buffering apparatus until at least a clock cycle later than the instructions are available, comprising:
    a first queue, having a first plurality of entries each for storing an instruction;
    a second queue, having a second plurality of entries corresponding to said first plurality of entries, each for storing information related to a corresponding said instruction in said first queue;
    a plurality of control signals, coupled to said first queue, for loading, shifting, and holding said instructions in said first queue; and
    a plurality of registers, coupled to receive said plurality of control signals, and to output one-clock-cycle-delayed versions of said plurality of control signals, for loading, shifting, and holding said related information in said second queue.

2. The apparatus of claim 1, wherein said instructions stored in said first queue comprise macroinstructions, and said first queue provides said macroinstructions to an instruction translator for translating said macroinstructions into microinstructions.

3. The apparatus of claim 2, wherein said macroinstructions comprise x86 macroinstructions.

4. The apparatus of claim 1, wherein said instructions are provided to said first queue by an instruction formatter.

5. The apparatus of claim 4, wherein said instructions comprise variable length instructions, and said instruction formatter receives a string of unformatted instruction bytes and formats said string of unformatted instruction bytes into said variable length instructions.

6. The apparatus of claim 1, wherein the buffering apparatus is coupled between an instruction cache of the microprocessor and an instruction execution stage of the microprocessor pipeline.

7. The apparatus of claim 6, wherein said related information comprises information received from a portion of the microprocessor other than said instruction cache.

8. The apparatus of claim 6, wherein said second queue is configured to provide said related information to said execution stage during a same clock cycle as said related information is received by said second queue.

9. The apparatus of claim 8, wherein a bottom one of said second plurality of entries of said second queue comprises:
a second register, for selectively storing said related information corresponding to said instruction stored in a corresponding bottom one of said first plurality of entries of said first queue during a clock cycle succeeding said same clock cycle; and
a multiplexer, having an input for receiving said related information during said same clock cycle, and an output coupled to an input of said second register and to said execution stage, for selectively providing said related information to said execution stage during said same clock cycle based on one or more of said one-clock-cycle-delayed versions of said plurality of control signals.

10. The apparatus of claim 8, wherein said second queue is configured to provide said related information to said execution stage during said same clock cycle as a translated instruction associated with said related information is provided to said execution stage.

11. The apparatus of claim 10, wherein said translated instruction is translated from said instruction stored in said first queue corresponding to said related information.

12. The apparatus of claim 11, wherein said translated instruction is translated by an instruction translator receiving said instruction from said first queue.

13. The apparatus of claim 12, wherein said instruction translator receives said instruction from said first queue during said same clock cycle.

14. The apparatus of claim 1, wherein said related information comprises an instruction pointer of a corresponding said instruction stored in said first queue.

15. The apparatus of claim 1, wherein said related information comprises a length of a corresponding said instruction stored in said first queue.

16. The apparatus of claim 1, wherein said related information comprises branch prediction information related to a corresponding said instruction stored in said first queue, wherein said corresponding said instruction is predicted to be a branch instruction.

17. The apparatus of claim 16, wherein said branch prediction information comprises a predicted target address of said branch instruction.

18. The apparatus of claim 16, wherein said branch prediction information comprises an indication of whether said branch instruction wraps across two groups of instruction bytes output by an instruction cache during distinct clock cycles.

19. The apparatus of claim 16, wherein at least a portion of said branch prediction information is derived from information generated by a branch target address cache.

20. The apparatus of claim 19, wherein said branch target address cache comprises an N-way set-associative cache, wherein said branch prediction information comprises an indication of a least-recently-used way within a selected set of said branch target address cache.

21. The apparatus of claim 19, wherein said branch target address cache comprises an N-way set-associative cache, wherein said branch prediction information comprises which of said N-ways of said branch target address cache is to be replaced.

22. The apparatus of claim 19, wherein said branch prediction information comprises information for correcting a misprediction of said branch instruction by said branch target address cache.

23. The apparatus of claim 16, wherein said branch prediction information comprises branch history table information.

24. The apparatus of claim 16, wherein said branch prediction information comprises a linear instruction pointer used to predict said branch instruction.

25. The apparatus of claim 16, wherein said branch prediction information comprises a branch pattern used to predict said branch instruction.

26. The apparatus of claim 16, wherein said branch prediction information specifies a branch instruction type of said branch instruction.

27. The apparatus of claim 1, wherein said related information comprises a displacement field of a corresponding said instruction stored in said first queue.

28. The apparatus of claim 1, wherein said related information comprises an immediate data field of a corresponding said instruction stored in said first queue.

29. An instruction buffer, comprising:
a plurality of muxed-registers, each for storing an instruction;
a plurality of registered-muxes, each for storing information related to said instruction in a corresponding one of said plurality of muxed-registers;
control logic, coupled to said plurality of muxed-registers, for generating a control signal for selectively loading said instruction into one of said plurality of muxed-registers; and
a register, coupled to receive a value on said control signal during a first clock cycle, and to output said value during a second clock cycle subsequent to said first clock cycle for selectively loading said related information in one of said plurality of registered-muxes corresponding to said one of said plurality of muxed-registers.

30. The instruction buffer of claim 29, wherein said corresponding one of said plurality of registered-muxes is also configured to selectively output said related information during said second clock cycle.

31. The instruction buffer of claim 30, wherein said one of said plurality of muxed-registers is configured to output said instruction during said second dock cycle.

32. The instruction buffer of claim 31, wherein said one of said plurality of muxed-registers outputs said instruction during said second clock cycle to an instruction translator.

33. A microprocessor, comprising:
- an instruction formatter, for outputting a branch instruction during a first clock cycle;
- control logic, for generating information related to a prediction of said branch instruction during a second clock cycle subsequent to said first clock cycle; and
- an instruction buffer, coupled to said instruction formatter, for buffering said branch instruction during said first clock cycle, for receiving said information during said second clock cycle, for selectively outputting said information during said second clock cycle if said instruction buffer was empty during said first clock cycle, and for selectively buffering said information during said second clock cycle if said instruction buffer was not empty during said first clock cycle.

34. The microprocessor of claim 33, further comprising:
- an execution stage, coupled to said instruction buffer, for receiving said information from said instruction buffer during said second clock cycle if said instruction buffer was empty during said first clock cycle, and for receiving said information from said instruction buffer during a third clock cycle subsequent to said second clock cycle if said instruction buffer was not empty during said first clock cycle.

35. The microprocessor of claim 34, further comprising:
- an instruction translator, coupled to said instruction buffer, for receiving said branch instruction from said instruction buffer during said second clock cycle if said instruction buffer was empty during said first clock cycle, and for receiving said branch instruction from said instruction buffer during said third clock cycle if said instruction buffer was not empty during said first clock cycle.

36. The microprocessor of claim 35, wherein said execution stage receives a translated microinstruction from said instruction translator during said second clock cycle if said instruction buffer was empty during said first clock cycle, and for receiving said translated microinstruction from said instruction translator during said third clock cycle if said instruction buffer was not empty during said first clock cycle.

37. A method for buffering instructions and related information m a microprocessor having a pipeline, comprising:
- loading an instruction into an instruction queue during a first clock cycle;
- generating information related to said instruction during a second clock cycle subsequent to said first clock cycle;
- determining whether said instruction is shifted out of said queue during said second clock cycle; and
- loading said related information into said queue during said second clock cycle if said instruction is not shifted out of said queue, and bypassing said queue during said second clock cycle to provide said related information along with said instruction to the pipeline if said instruction is shifted out of said queue.

38. The method of claim 37, further comprising:
- determining whether said instruction is shifted down within said queue during said second clock cycle if said instruction is not shifted out of said queue; and
- shifting said related information down within said queue during a third clock cycle subsequent to said second clock cycle if said instruction is shifted down within said queue during said second clock cycle.

39. An instruction buffer, comprising:
- a first multiplexer, comprising an output, a hold data input, a load data input coupled to receive an instruction during a first clock cycle, and a control input coupled to receive a first control signal, wherein said first multiplexer selects said load data input if said control input is true and said hold data input otherwise;
- a first register, comprising an input coupled to said first multiplexer output, and an output coupled to said first multiplexer hold data input;
- a second register, having an input and an output;
- a second multiplexer, comprising an output coupled to said second register input, a hold data input coupled to said second register output, a load data input coupled to receive information related to said instruction during a second clock cycle subsequent to said first clock cycle, and a control input coupled to receive a second control signal, wherein said second multiplexer selects said load data input if said control input is true and said hold data input otherwise; and
- a third register, having an input coupled to receive said first control signal during said first clock cycle, and an output for generating said second control signal during said second clock cycle, whereby said instruction and said related information are output during said second clock cycle if said first control signal is true during said first clock cycle.

40. The instruction buffer of claim 39, wherein said second multiplexer further includes a shift data input coupled to receive an output of a fourth register for storing data of an entry of the instruction buffer above an entry comprised by said second register and said second multiplexer, and a second control input for receiving a third control signal, wherein said second multiplexer selects said shift data input if said control input is false and said second control input is true, and said hold data input otherwise.

41. A computer program product stored in a computer-readable medium selected from a group consisting of semiconductor memory, magnetic disk, and optical disk, comprising:
- computer-readable program code for providing an apparatus for buffering instructions and related information in a pipelined microprocessor, wherein the related information is not available to the buffering apparatus until at least a clock cycle later than the instructions are available, said program code comprising:
  - first program code for providing a first queue, having a first plurality of entries each for storing an instruction;
  - second program code for providing a second queue, having a second plurality of entries corresponding to said first plurality of entries, each for storing information related to a corresponding said instruction in said first queue;
  - third program code for providing a plurality of control signals, coupled to said first queue, for loading, shifting, and holding said instructions in said first queue; and
  - fourth program code for providing a plurality of registers, coupled to receive said plurality of control signals, and to output one-clock-cycle-delayed versions of said plurality of control signals, for loading, shifting, and holding said related information in said second queue.

* * * * *